United States Patent Office 3,079,394
Patented Feb. 26, 1963

3,079,394
NOVEL CHEMICAL COMPOUND
Rostyslaw Dowbenko, New Kensington, Pa., assignor to Pittsburgh Plate Glass Company, a corporation of Pennsylvania
No Drawing. Filed Feb. 10, 1960, Ser. No. 7,765
9 Claims. (Cl. 260—286)

This invention relates to novel chemical compounds and to the method of forming the same, and it has particular relation to salts comprising as their fundamental structural unit an N-(2-carbamylalkyl)pyridinium moiety or a substitution product or a hydrogenation product thereof.

It has heretofore been disclosed to react aliphatic amides with formaldehyde and salts of tertiary heterocyclic bases, such as pyridinium salts, and containing the group:

(X being an acid radical) to provide a type of quaternary ammonium compound of the formula:

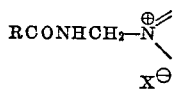

wherein R is an aliphatic hydrocarbon radical. In event that R is a long chain alkyl radical, such as occurs in the hydrocarbon moiety of a higher fatty acid, the reaction is feasible. The methylene group of formaldehyde provides a bridge between the two nitrogen atoms.

In accordance with this invention, it has been found that if the hydrocarbon moiety is short and unsaturated, especially when the unsaturation is alpha-beta to the carbonyl group, a different reaction is obtained. This occurs either in the presence or in the absence of formaldehyde or other aldehydes. The product contains the moiety:

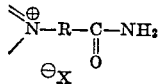

These compounds belong to the quaternary ammonium family. The reaction between a pyridinium salt and an amide of an ethylenically unsaturated carboxylic acid in accordance with the provisions of this invention, is represented by the equation for the reaction of pyridinium chloride and acrylamide, which proceeds as follows:

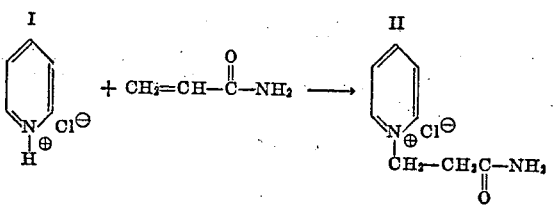

The product of the reaction may be termed N-(2-carbamylethyl)pyridinium chloride. It will be observed that the structure of the product contains no methylene linkage between the nitrogen of the pyridine ring and the amido nitrogen, and is therefore substantially different from the products which have heretofore been obtained by reaction in the presence of formaldehyde of pyridinium-type salts and amides of long chain fatty acids.

A generalized formula for this type quaternary ammonium or N-(2-carbamylalkyl)pyridinium salt may be represented by the formula:

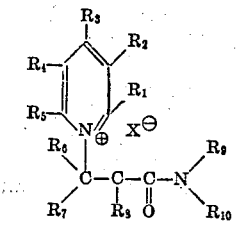

wherein X is an acid radical, such as chloride, bromide, iodide. Groups or radicals $R_1$, $R_2$, $R_3$, $R_4$ and $R_5$ may be hydrogen, halogen (—Cl, Br, I, F) hydrocarbon containing up to about 8 carbon atoms and being represented by methyl, ethyl, propyl, butyl, and the like; substituted hydrocarbon groups containing 1 to about 8 carbon atoms and being represented by methyl, ethyl, propyl, and the like, and having at least one hydrogen atom replaced by a substituent, such as a halogen or hydroxyl group, or other substituents that do not interfere with the fundamental reaction. In event that all or a part of the groups or radicals $R_1$, $R_2$, $R_3$, $R_4$ and $R_5$ are hydrocarbon or substituted hydrocarbon, pairs thereof may be consolidated or joined together into one or more rings on the pyridine ring. These azine or pyridinium compounds, as well as the others herein disclosed, may be represented by the formula:

wherein

comprises, in addition to hydrogen atoms or such other radicals as may occur in the side chains, 5 carbon atoms in a chain attached at opposite ends to the nitrogen atom to provide a six-membered heterocyclic ring. Substituted compounds containing such rings are represented by picoline and lutidines, substituted pyridines wherein a plurality of hydrocarbon groups or substituted hydrocarbon groups are joined to provide aryl rings condensed with the pyridine ring are represented by quinoline, isoquinoline, acridine, phenanthridine, and others. In isoquinoline, the group A assumes the structure:

The groups $R_6$, $R_7$ and $R_8$ are represented by hydrogen, halogen (Cl, Br, I, F), alkyl hydrocarbons containing 1 to about 8 carbon atoms and being represented by methyl, ethyl, propyl and butyl, and by substituted hydrocarbon groups wherein one or more of the hydrogen atoms of said hydrocarbon containing 1 to about 8 carbon atoms are replaced by functional substituents represented by halogen (Cl, Br, I, F), —OH or other functional substituents that do not seriously interfere with the fundamental reaction. One or more of the groups $R_6$, $R_7$ and $R_8$ may also be represented by carboxyl or carbonyl groups, such as —$CONH_2$, —$CH_2COONH_2$, —COOH, —$CH_2COOH$ and COOR, wherein R is an aliphatic hydrocarbon group containing up to about 8 carbon atoms and being represented by methyl, ethyl, propyl, and the like.

Groups $R_9$ and $R_{10}$ may be atoms of hydrogen or alkyl hydrocarbon groups containing up to about 8 carbon atoms, or substituents thereof in which at least one hydrogen atom is replaced by a group such as a halogen (Cl, Br, I or F) or a hydroxyl group.

The reaction product of pyridinium chloride and acrylamide has been established to be N-(2-carbamylethyl)pyridinium chloride by hydrogenating the pyridinium ring to form the corresponding N-(2-carbamylethyl)piperidinium chloride. The latter compound is identical with that resulting from the reaction of piperidine and 3-chloropropionamide. The N-(2-carbamylethyl)piperidinium chloride, when treated with potassium carbonate, is converted to 3-N-(piperidyl)propionamide, which is identical with that resulting from the reaction of acrylamide and piperidine.

The reactions of the series by which the structure of applicant's reaction product of pyridinium chloride and acrylamide are established are as follows:

EQUATIONS PROVING THE STRUCTURE OF APPLICANT'S MATERIALS

N-(2-carbamylethyl)pyridinium chloride from Example I

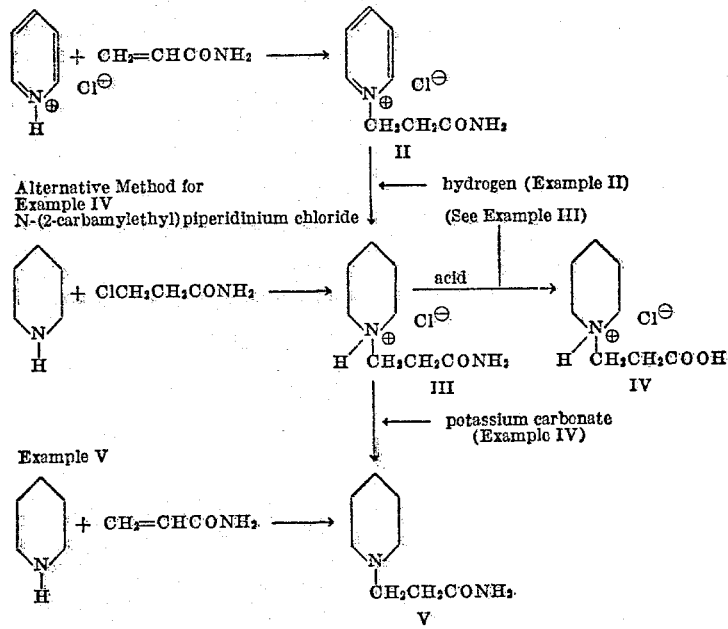

In the practice of this invention, it is to be appreciated that salts having the foregoing generalized structure may be obtained by the replacement of the acrylamide by amides of other ethylenically unsaturated carboxylic acids. Appropriate amides comprise:

Acrylamide (already mentioned)
Methacrylamide
The diamide of glutaconic acid
Crotonamide
The diamide of ethyl maleic acid
The diamide of itaconic acid
The diamide of citraconic acid
Alpha-chloroacrylamide
Beta-chloroacrylamide
Alpha-ethyl acrylamide
Beta-propyl acrylamide, and others.

The amines utilized can be any of the aromatic heterocyclic amines, such as the halides, including the chloride, the bromide and the iodide of:

| | |
|---|---|
| Pyridine | 3-bromopyridine |
| 2-methylpyridine | 2-chloropyridine |
| Quinoline | 3-chloropyridine |
| Acridine | 3-ethylpyridine |
| Isoquinoline | 4-ethylpyridine |
| Phenanthridine | 2-isopropylpyridine |
| 2-allyl-2-aminopyridine | 3-methoxypyridine |
| 2-benzylpyridine | 2-phenylpyridine |
| 3-benzylpyridine | | and others that contain a pyridine

ring and are represented by the structure

wherein

A has the structure previously defined.

A generalized procedure for the reaction of salts of heterocyclic amines, such as pyridinium chloride, containing the group

and alpha-beta unsaturated amides is as follows:

*Example I*

To a solution of 0.20 mole (in grams) of unsaturated amide, such as acrylamide or other amide as herein illustrated, is added 0.20 mole of a heterocyclic amine in 50 milliliters of a nonreactive solvent, such as methanol. Then a solution of 0.20 mole of dry hydrogen chloride in 50 milliliters of methanol is added with cooling. The resultant solution is refluxed for 4 hours, filtered, and is then evaporated to about one-half its original volume. In order to provide a crystallization medium, the solution is diluted with acetone and is then cooled. The product is precipitated and is isolated by filtration, and may be further purified by one or more recrystallizations from a mixture of methanol and acetone. In the event that the product is N-(2-carbamylethyl)pyridinium chloride, the melting point is 195 to 197° C.

If preferred, the pyridine and hydrochloric acid may be preliminarily reacted to provide pyridinium hydrochloride, which is then reacted with the acrylamide by refluxing the solution of the two for 2 hours. When the starting materials are pyridine and acrylamide, either procedure results in a yield of about 93 percent of the desired product, N-(2-carbamylethyl)pyridinium chloride.

The reaction time and temperature may be either increased or decreased as may be desired. For example, good yields of comparable products have been obtained by running the reaction at room temperature for 1.5 hours.

*Example II*

As one step in demonstrating that the foregoing product is indeed N-(2-carbamylethyl)pyridinium chloride, a hydrogenation was conducted to form N-(2-carbamylethyl)piperidinium hydrochloride.

In this reaction, an 18.5-gram (0.10 mole) sample of the pyridinium salt was dissolved in 200 milliliters of methanol and 0.5 gram of platinum oxide as a catalyst was added. Hydrogenation was started and the mixture was shaken until the pressure was constant. This required about 1 hour and during this time 105 percent of the theoretical amount of hydrogen was absorbed. There was obtained 17 grams (88.5 percent of the theoretical yield) of the piperidinium compound, represented by the structural formula:

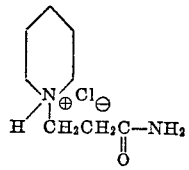

Several recrystallizations of this material resulted in a product having a melting point of 196 to 197° C. The empirical formula of this material is $C_8H_{17}ClN_2O$. This assumption is supported by quantitative analysis in which the following values were obtained:

|   | Found | Theoretical |
|---|---|---|
| C | 49.75 | 49.86 |
| H | 9.14 | 8.89 |
| Cl | 18.42 | 18.40 |
| N | 14.60 | 14.54 |

*Example III*

The foregoing compound, N-(2-carbamylethyl)piperidinium chloride, was subjected to hydrolysis by the following procedure:

A mixture of 10 grams (0.052 mole) of the N-(2-carbamylethyl)piperidinium chloride compound of the formula:

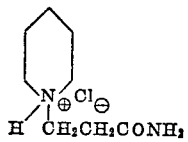

and 50 milliliters of concentrated hydrochloric acid were refluxed for 6 hours. Hydrochloric acid was removed by evaporation in vacuum. Water was then added and the process was repeated several times. The residue was dissolved in a minimum amount of hot water, filtered, and allowed to crystallize. Filtration and recrystallization of the solid from aqueous acetone gave 7 grams (70 percent of the theoretical amount) of white, shiny platelets of the acid product having the formula:

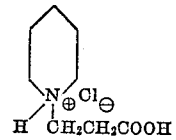

This material, after several recrystallizations from the same solvent, had a melting point of 212–213° C. The empirical formula of the material is $C_8H_{16}ClN_2O$. Two samples were subjected to quantitative analysis. The experimentally determined and the theoretical analyses of the compound are:

|   | Found | | Theoretical |
|---|---|---|---|
|   | Sample 1 | Sample 2 |   |
| C | 50.03 | 49.84 | 49.61 |
| H | 8.40 | 8.36 | 8.33 |
| Cl | 17.03 | 17.26 | 18.31 |
| N | 7.04 | 6.83 | 7.23 |

The values found check very well with the thoretical values.

*Example IV*

In this example, N-(2-carbamylethyl)piperidinium chloride was prepared by a different reaction; namely, that between piperidine and 3-chloropropionamide. In the reaction, 17.0 grams (0.20 mole) of piperidine and 21.6 grams (0.20 mole) of 3-chloropropionamide were dissolved in 100 milliliters of methanol and were refluxed for 4 hours. The hot solution was filtered and distilled to one-half of its original volume, and the solution was then allowed to cool. Acetone was added and recrystallization was effected. A nearly-white solid was precipitated and was filtered off in an amount of 30.5 grams (79 percent of theoretical). This solid had a melting point of 193–196° C.

An analytical sample was prepared from the solid by crystallizing it several times from a solution of methanol and acetone, thus providing a material having a melting point of 197–198° C. The melting point of this material was not depressed by incorporation of the material with the material obtained from Example II. Likewise, the infrared spectra of the two compounds were indistinguishable. Obviously, the materials were identical. It is, therefore, demonstrated that the formula of the product in Example I is correct.

The empirical formula of the N-(2-carbamylethyl)piperidinium chloride of this example is $C_8H_{17}ClN_2O$. Quantitative analysis of the N-(2-carbamylethyl)piperidinium chloride of this example has been confirmed by analyses of two samples, which are as follows:

|   | Found | | Theoretical |
|---|---|---|---|
|   | Sample 1 | Sample 2 |   |
| C | 50.32 | 50.35 | 49.86 |
| H | 8.85 | 8.87 | 8.89 |
| Cl | 18.34 | 18.37 | 18.40 |
| N | 14.85 | 14.65 | 14.54 |

Example V

In accordance with the provisions of this example, the N-(2-carbamylethyl)piperidinium chloride of the preceding examples, II or IV, is hydrolyzed with potassium carbonate to provide 3-N-(piperidyl)propionamide of the structure:

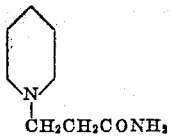

In conducting the reaction, a solution of 9.35 grams (0.0485 mole) of N-(2-carbamylethyl)piperidinium chloride and 6.9 grams (0.05 mole) of potassium carbonate are dissolved in 200 milliliters of methanol and 30 milliliters of water, and the mixture is allowed to stand overnight. The solvent is evaporated under vacuum and the residue is dried by azeotropic distillation with benzene. The residue is next dissolved in ethyl acetate and the inorganic salts are filtered off. The solution is evaporated to obtain a straw-colored oil which crystallizes on standing. Further recrystallization of the product from a mixture of ether and hexane gives 6.5 grams (86 percent of theoretical) of white, highly hydroscopic plates having a melting point of 63–68° C. These dissolved in water to give a strongly alkaline solution. The product is recrystallized several times from the foregoing solvent mixture to provide an analytical sample having a melting point of 80–81° C. The empirical formula of the 3-N-(piperidyl)propionamide, which this material is assumed to be, is $C_8H_{16}N_2O$. In a specific instance, two samples of the material were subjected to quantitative analysis and the data thereof are tabulated as follows:

|   | Found | | Theoretical |
|---|---|---|---|
|   | Sample 1 | Sample 2 |   |
| C | 61.89 | 61.01 | 61.50 |
| H | 10.15 | 9.99 | 10.32 |
| N | 17.63 | 17.60 | 17.94 |

Example VI

In this example, the structure of the 3-N-(piperidyl)propionamide of the foregoing example was confirmed by the preparation of the same compound by a different technique; namely, by the reaction of a solution of piperidine and acrylamide. In accordance with this example, a solution of 14.2 grams (0.20 mole) of acrylamide in 50 milliliters of a non-reactive solvent; namely, 1,2-dimethoxyethane, was added dropwise with agitation to a solution of 17.0 grams (0.20 mole) of piperidine in 50 milliliters of the same solvent. The solution was stirred for 3 hours and was then refluxed for a like period of time. Solvent was then evaporated under vacuum to provide a straw-colored solid, which was recrystallized from a mixture of ether and hexane to give 22.0 grams (70.5 percent of theoretical) of a nearly-white, hygroscopic solid having a melting point of 77–78° C.

An analytical sample was prepared from this material by repeated recrystallizations from ether containing a small amount of methanol and hexane. The melting point of the product was 80–81° C., confirming that of the material of the preceding example (V). This material when mixed with that of the preceding example, did not depress its melting point. The infrared spectra of the two materials were identical. The empirical formula of the material of this example was assumed to be the same as that of the preceding example, and the correctness thereof was also checked by quantitative analysis conducted upon duplicate samples. The results of the analyses were as follows:

|   | Found | | Theoretical |
|---|---|---|---|
|   | Sample 1 | Sample 2 |   |
| C | 61.51 | 61.34 | 61.50 |
| H | 10.00 | 10.19 | 10.32 |
| N | 17.62 | 17.59 | 17.94 |

Example VII

The general reaction as disclosed in Example I has been applied to the preparation of corresponding reaction products of various pyridinium compounds and unsaturated short chain amides. The results of some of these tests are tabulated as follows:

TABLE.—REACTION OF ALPHA-BETA UNSATURATED AMIDES WITH HETEROCYCLIC SALTS [1]

| Base | Amide | Yield of Product [2] | M.P., °C. | Formula | Calculated | | | | Found | | | |
|---|---|---|---|---|---|---|---|---|---|---|---|---|
|   |   |   |   |   | C | H | Cl | N | C | H | Cl | N |
| Pyridine | Acrylamide | 93 | 195–197 | $C_8H_{11}ClN_2O$ | 51.48 | 5.94 | 19.00 | 15.01 | 51.69, 51.73 | 5.77, 5.90 | 18.81, 18.86 | 14.78, 14.88 |
| 2-Methylpyridine | do | 93 | 171.5–172.5 | $C_9H_{13}ClN_2O$ | 53.86 | 6.53 | 17.67 | 13.96 | 53.68, 53.77 | 6.45, 6.69 | 17.59, 17.61 | 14.16, 14.12 |
| Quinoline | do | 82 | 199–200 | $C_{12}H_{13}ClN_2O$ | 60.80 | 5.54 | 14.98 | 11.84 | 60.24, 60.04 | 5.62, 5.83 | 14.92, 14.61 | 11.59, 11.70 |
| Isoquinoline | do | 85 | 210.5–212 | $C_{12}H_{13}ClN_2O$ | 60.80 | 5.54 | 14.98 | 11.84 | 61.17, 61.06 | 5.47, 5.54 | 15.07, 15.19 | 11.59, 11.73 |
| Phenanthridine | do | 84 | 234 | $C_{16}H_{15}ClN_2O$ | 67.01 | 5.27 | 12.37 | 9.77 | 67.20, 67.03 | 5.45, 5.36 | 12.41, 12.38 | 9.60, 9.58 |
| Pyridine | Methacrylamide | 38 | 205 | $C_9H_{13}ClN_2O$ | 53.86 | 6.53 | 17.67 | 13.96 | 53.21, 53.33 | 6.59, 6.57 | 17.49, 17.46 | 13.77, 13.91 |
| Do | Crotonamide | 51 | 183–184 | $C_9H_{13}ClN_2O$ | 53.86 | 6.53 | 17.67 | 13.96 | 53.03, 53.08 | 6.57, 6.63 | 14.46, 17.58 | 13.91, 14.13 |

[1] According to Example I.
[2] Before recrystallization from a mixture of methanol and acetone.
In the table, the experimentally determined analyses are given for duplicate samples.

The several pyridinium and piperidinium salts as disclosed herein are contemplated for various uses. One such use is as an accelerator of gelation in mixtures of polyesters of glycols and alpha-beta ethylenic dicarboxylic acids with monomers containing a $>C=CH_2$ group, such as styrene. A like use for quaternary ammonium compounds is disclosed in Parker Patent 2,740,765. The quaternary ammonium salts, such as N-(2-carbamylethyl)pyridinium chloride or N-(2-carbamylethyl)piperidinium chloride as disclosed herein, may be added to the list of quaternary ammonium compounds as disclosed in the foregoing patent.

The salts also can be used as catalysts for the cure of urea-formaldehyde and melamine-formaldehyde resins, especially when these resins are mixed with alkyd resins.

Example VIII

For purposes of demonstrating the utility of N-(2-carbamylethyl)pyridinium chloride and N-(2-carbamylethyl)piperidinium chloride as accelerators of gelation in a polyester-monomer mix, an SPI gel time test was conducted. This is a standard test employed in the plastics industry. In this test, the polyester was a commercial material and comprised a mixed maleate-phthalate comprising 1 mole of maleic acid per mole of phthalic acid, the two acids being reacted with approximately an equivalency of propylene glycol. The monomer employed was styrene. Hydroquinone was employed as a gelation inhibitor. The resinifiable mixture comprised:

| | Grams |
|---|---|
| Polyester | 650 |
| Styrene | 370 |
| Hydroquinone | 0.1 |

To this mixture was added 0.5 gram of N-(2-carbamylethyl)pyridinium chloride dissolved in methyl alcohol, the addition being effected at a temperature of 150° C. To the mixture was further added 1 percent based upon the mixture of a catalyst (cumene hydroperoxide). The catalyzed mixture was introduced into a test tube in a water bath, heated to 180° F., and the gel time was then observed. This was found to be 2.73 minutes, as contrasted with a gel time of about 20 to 30 minutes for a like mixture from which the accelerator, N-(2-carbamylethyl)pyridinium chloride, has been omitted.

*Example IX*

In this example, the N-(2-carbamylethyl)piperidinium chloride resulting from the hydrogenation of N-(2-carbamylethyl)pyridinium chloride was substituted for the latter compound in Example VIII. The proportions were the same and the accelerator was used in a like weight. The SPI gel time was 2 minutes 35 seconds. The material is a good promoter of gelation.

Although specific examples of the invention have been set forth hereinabove, it is not intended to limit the invention thereto, but to include all of the variations and modifications falling within the scope of the appended claims.

I claim:
1. The method of forming the compound:

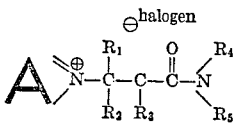

which comprises reacting
(I) a compound of the formula:

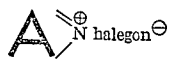

wherein

is hydrocarbon containing a chain of 5 carbon atoms forming with the nitrogen atom a heterocyclic six-sided pyridinium ring, with
(II) a compound of the formula:

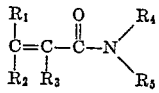

wherein
$R_1$, $R_2$ and $R_3$ are groups selected from the class consisting of (a) hydrogen, (b) halogen, (c) alkyl containing from 1 to 8 carbon atoms, (d) alkyl wherein a hydrogen atom is replaced by a substituent selected from the class consisting of a halogen atom and a hydroxyl group, (e) —$CONH_2$, (f)

—$CH_2CONH_2$ (g) —COOH, (h) —$CH_2COOH$, and (i)

—$CH_2COOR_0$ $R_0$ being selected from the class consisting of alkyl having from 1 to 8 carbon atoms and alkyl wherein at least one hydrogen atom is replaced by an alkyl radical containing from 1 to 8 carbon atoms with a substituent selected from the class consisting of a halogen atom and a hydroxyl group, and $R_4$ and $R_5$ are groups selected from the class consisting of hydrogen and alkyl having from 1 to 8 carbon atoms and radicals and groups obtained by replacement of a hydrogen atom of alkyl having from 1 to about 8 carbon atoms with a substituent selected from the class consisting of a halogen atom and a hydroxyl group.

2. N-(2-carbamylethyl)-phenanthridinium halide.
3. N-(2-carbamylethyl)-piperidinium halide.
4. A method of forming an N-(2-carbamylethyl)-pyridinium halide which comprises mixing a pyridinium halide and acrylamide to form said compound through addition reaction.
5. A method of forming an N-(2-carbamyl-2-methylethyl)-pyridinium halide which comprises mixing a pyridinium halide with methacrylamide to effect addition reaction, whereby to provide said N-(2-carbamyl-2-methylethyl)pyridinium halide.
6. A method of forming N-(2-carbamylmethylethyl)-pyridinium halide which comprises mixing a pyridinium halide with a crotonamide to effect addition reaction, whereby to provide said N-(2-carbamylmethylethyl)pyridinium halide.
7. A method of forming an N-(2-carbamylethyl)-quinolinium halide which comprises mixing crotonamide and a quinolinium halide to effect addition reaction between the two compounds.
8. A method of forming an N-(2-carbamylethyl)-isoquinolinium halide which comprises mixing acrylamide with an isoquinolinium halide to effect addition reaction between the two compounds.
9. A method of forming an N-(2-carbamylethyl)-phenanthridinium halide which comprises mixing acrylamide and an N-phenanthridinium halide to effect addition reaction between the two compounds.

References Cited in the file of this patent

UNITED STATES PATENTS

| 2,295,655 | Hentrich et al. | Sept. 15, 1942 |
| 2,348,613 | De Groote et al. | May 9, 1944 |
| 2,381,709 | Apgar et al. | Aug. 7, 1945 |
| 2,627,512 | Zerner et al. | Feb. 3, 1950 |
| 2,776,280 | Brooker et al. | Jan. 1, 1957 |

OTHER REFERENCES

Lutz: Ber., vol. 43, p. 2638 (1910).
Lutz et al.: Ann., vol. 505, p. 307 (1933).
Stahmann et al.: J. Org. Chem., vol. 11, p. 719 (1946).
Backes et al.: Comptes Rendus, vol. 239, pages 1467–1649 (1954).

UNITED STATES PATENT OFFICE
CERTIFICATE OF CORRECTION

Patent No. 3,079,394            February 26, 1963

Rostyslaw Dowbenko

It is hereby certified that error appears in the above numbered patent requiring correction and that the said Letters Patent should read as corrected below.

Column 2, lines 6 to 15, the formula should appear as shown below instead of as in the patent:

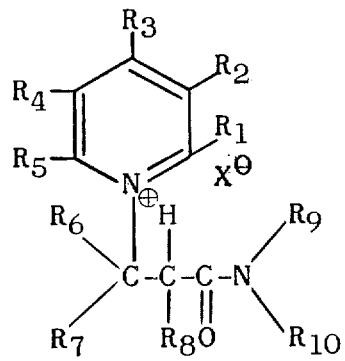

column 9, lines 39 to 43, the formula should appear as shown below instead of as in the patent:

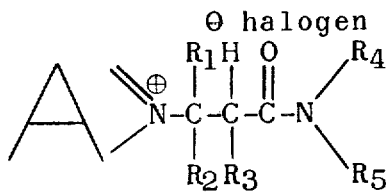

Signed and sealed this 5th day of May 1964.

(SEAL)
Attest:

ERNEST W. SWIDER           EDWARD J. BRENNER
Attesting Officer           Commissioner of Patents